(12) United States Patent
Saji

(10) Patent No.: US 10,227,464 B2
(45) Date of Patent: Mar. 12, 2019

(54) FIBER-REINFORCED PLASTIC SHAPED PRODUCT

(71) Applicant: Teijin Limited, Osaka-shi, Osaka (JP)

(72) Inventor: Toshifumi Saji, Osaka (JP)

(73) Assignee: Teijin Limited, Osaka-Shi, Osaka (JP)

( * ) Notice: Subject to any disclaimer, the term of this patent is extended or adjusted under 35 U.S.C. 154(b) by 27 days.

(21) Appl. No.: 15/108,923

(22) PCT Filed: Mar. 18, 2015

(86) PCT No.: PCT/JP2015/058114
§ 371 (c)(1),
(2) Date: Jun. 29, 2016

(87) PCT Pub. No.: WO2015/141742
PCT Pub. Date: Sep. 24, 2015

(65) Prior Publication Data
US 2016/0319088 A1 Nov. 3, 2016

(30) Foreign Application Priority Data
Mar. 20, 2014 (JP) .................................. 2014-058165

(51) Int. Cl.
*B29C 70/12* (2006.01)
*C08J 5/24* (2006.01)
(Continued)

(52) U.S. Cl.
CPC . *C08J 5/24* (2013.01); *C08J 5/04* (2013.01); *C08J 5/042* (2013.01); *C08K 7/06* (2013.01);
(Continued)

(58) Field of Classification Search
CPC ....... B29C 70/12; B29C 70/22; B29C 70/081; B29C 70/202; B29C 70/222
See application file for complete search history.

(56) References Cited

U.S. PATENT DOCUMENTS 3,449,199 A * 6/1969 Mead ...................... B29C 53/32
152/197
3,622,428 A * 11/1971 Robinson .............. B29C 70/202
156/246
(Continued)

FOREIGN PATENT DOCUMENTS

| JP | S62-196134 A | 8/1987 |
|---|---|---|
| JP | 2004-060058 A | 2/2004 |

(Continued)

OTHER PUBLICATIONS

Jun. 16, 2015—(PCT/JP) Written Opinion—App 2015/058114—Eng Tran.
Jun. 16, 2015—International Search Report—App PCT/JP2015/058114.
Mar. 3, 2017—(EP) Supplementary Search Report—App 15764156.

*Primary Examiner* — Alexander S Thomas
(74) *Attorney, Agent, or Firm* — Banner & Witcoff, Ltd.

(57) ABSTRACT

Provided is a fiber-reinforced plastic shaped product constituted by a fiber-reinforced resin material including reinforcing fibers and a thermoplastic resin, characterized in that the reinforcing fibers include short fibers and include reinforcing fibers which have been arranged in a wavy arrangement in the thickness direction. This fiber-reinforced plastic shaped product hence has improved thickness-direction mechanical strength while retaining intact in-plane-direction mechanical strength.

7 Claims, 7 Drawing Sheets

(51) Int. Cl.
    *C08J 5/04*    (2006.01)
    *C08K 7/06*    (2006.01)
    *B29C 70/20*   (2006.01)
    *B29C 70/08*   (2006.01)

(52) U.S. Cl.
    CPC .......... *B29C 70/081* (2013.01); *B29C 70/202* (2013.01); *C08J 2300/22* (2013.01); *C08J 2377/02* (2013.01)

(56) References Cited

U.S. PATENT DOCUMENTS

| | | | |
|---|---|---|---|
| 3,684,645 A * | 8/1972 | Temple ................ | B29C 70/081 156/166 |
| 4,868,038 A * | 9/1989 | McCullough, Jr. ...... | C08K 7/06 428/222 |
| 2003/0114575 A1* | 6/2003 | Teutsch ................... | C08K 7/06 524/494 |
| 2004/0247845 A1 | 12/2004 | Abe et al. | |
| 2013/0323495 A1 | 12/2013 | Kajiwara et al. | |
| 2014/0303306 A1 | 10/2014 | Kajiwara et al. | |

FOREIGN PATENT DOCUMENTS

| | | | |
|---|---|---|---|
| JP | 2011-207048 A | 10/2011 | |
| JP | 2013-245252 A | 12/2013 | |
| JP | 2013-245253 A | 12/2013 | |
| JP | 2015-037855 A | 2/2015 | |
| WO | 2012-114829 A1 | 8/2012 | |

* cited by examiner

FIBER-REINFORCED PLASTIC SHAPED PRODUCT

CROSS REFERENCE TO RELATED APPLICATIONS

This is a U.S. National Phase Application under 35 U.S.C. § 371 of International Application No. PCT/JP2015/058114, filed Mar. 18, 2015, which claims priority to Japanese Application 2014-058165 filed Jun. 20, 2014 and which was published Under PCT Article 21(2), the entire contents of which are incorporated herein by reference.

TECHNICAL FIELD

The present invention relates to a fiber-reinforced plastic shaped product including carbon fibers and a thermoplastic resin. More particularly, the invention relates to a fiber-reinforced plastic shaped product which has excellent thickness-direction impact resistance and is suitable for use as structural components for vehicles, or the like.

BACKGROUND ART

In the field of machinery, the so-called fiber-reinforced plastics including a matrix resin and reinforcing fibers, e.g., carbon fibers, are attracting attention in recent years. Since these fiber-reinforced plastics are excellent in terms of tensile modulus, tensile strength, impact resistance, etc. due to the reinforcing fibers dispersed in the plastics, and use thereof in applications such as structural members for motor vehicles or the like is being investigated. These fiber-reinforced plastics can be formed into desired shapes using compression molding, or the like.

However, fiber-reinforced plastics have had a peculiar problem in that since the fibers have mostly been aligned not in the thickness direction, these fiber-reinforced plastics are not always excellent in terms of thickness-direction mechanical strength, specifically, compressive strength and ability to absorb impact energy. Although it is, of course, possible to improve these properties by increasing the material thickness, it has been pointed out that the increased thickness reduces design choices or results in a problem in that the resultant increase in weight impairs the intrinsic attractiveness of fiber-reinforced plastics.

In view of such problems, patent document 1 proposes a method in which fibers in a fiber-reinforced plastic are aligned in the thickness direction by a needle punching method. This needle punching method has an advantage in that thickness-direction compressive strength, etc. can be improved by stabbing an unformed fiber-reinforced plastic material with needles to arrange the reinforcing fibers within the needle-stabbed portions so that the longitudinal directions of the reinforcing fibers are aligned in the thickness direction. However, the following problem has been pointed out. In the needle punching method, there are often cases where when needles are stabbed into an unformed fiber-reinforced plastic material, the reinforcing fibers are damaged or broken. Because of this, the thickness-direction mechanical strength improves at the sacrifice of in-plane-direction strength.

In order to suppress the decrease in in-plane-direction strength which is the problem of patent document 1, patent document 2 proposes a method in which a precursor for reinforcing fibers is crimped, entangled by a needle punching method or the like, and then burned to produce a nonwoven fabric of reinforcing fibers and a fiber-reinforced plastic is obtained therefrom to thereby maintain the in-plane-direction strength. However, even in this method, the problem wherein the in-plane-direction strength undesirably decreases remains unimproved since some of the reinforcing fibers are oriented in the thickness direction. In addition, in such a method, not only the reinforcing fibers themselves become bulky undesirably, but also some degree of material thickness is necessary for maintaining strength. It has hence been pointed out that the proposed method is prone to result in a decrease in formability and induce an obstacle to thickness reduction.

Furthermore, patent document 3 discloses a composite material in which the impact strength and other properties have been improved by using continuous fibers as the only reinforcing fibers and wavily disposing continuous fibers so that all the continuous fibers match in wavelength with each other. However, in the composite material of patent document 3 since continuous fibers are used as the only reinforcing fibers and the continuous fibers have been made to match in the wavelength direction of the wavy shape, there is a problem in that this composite material undesirably has considerably reduced, rather than increased, strength in directions perpendicular to the wavelength direction. In addition, the following problem has been pointed out: since continuous fibers are used as the only reinforcing fibers, the composite material, when the reinforcing fibers are wavily arranged, unavoidably come to include portions in which reinforcing fibers are absent and which are constituted by the resin only. Consequently, such portions are causative of unevenness in strength, or the like.

RELATED DOCUMENTS

Patent Documents

Patent Document 1: JP-A-2004-60058
Patent Document 2: JP-A-2013-245253
Patent Document 3: JP-A-62-196134

SUMMARY OF THE INVENTION

Problems that the Invention is to Solve

The present invention has been achieved in view of those problems. A main objective of the invention is to provide a fiber-reinforced plastic shaped product in which the thickness-direction mechanical strength has been improved without impairing the in-plane-direction mechanical strength.

Means for Solving the Problem

The present invention provides the following means in order to solve the problems.

(1) A fiber-reinforced plastic shaped product including a fiber-reinforced resin material containing reinforcing fibers and a thermoplastic resin, wherein the reinforcing fibers include short fibers and include reinforcing fibers arranged in a wavy arrangement in a thickness direction.

(2) The fiber-reinforced plastic shaped product according to (1), wherein only in a region in the thickness direction, the reinforcing fibers are arranged in the wavy arrangement in the thickness direction.

(3) The fiber-reinforced plastic shaped product according to (1) or (2), wherein the reinforcing fibers arranged in the wavy arrangement in the thickness direction are present in a layered form.

(4) The fiber-reinforced plastic shaped product according to any one of (1) to (3), wherein the reinforcing fibers arranged in the wavy arrangement in the thickness direction are present only in an inner layer.

(5) The fiber-reinforced plastic shaped product according to any one of (1) to (4), wherein a proportion, in the thickness direction, of regions where the reinforcing fibers arranged in the wavy arrangement in the thickness direction are present is in a range of 5% to 95% of the thickness of the fiber-reinforced plastic shaped product.

(6) The fiber-reinforced plastic shaped product according to any one of (1) to (5), wherein the reinforcing fibers arranged in the wavy arrangement in the thickness direction have an orientation angle in a range of 10° to 90°.

(7) The fiber-reinforced plastic shaped product according to any one of (1) to (6), wherein the reinforcing fibers are in a form of fiber bundles and have an average fiber length in a range of 1 mm to 100 mm.

Effects of the Invention

The fiber-reinforced plastic shaped product of the invention produces an effect wherein the shaped product has excellent thickness-direction mechanical strength without impairing in-plane-direction mechanical strength.

EMBODIMENT FOR CARRYING OUT THE INVENTION

As stated above, the fiber-reinforced plastic shaped product of the invention is constituted by a fiber-reinforced resin material including reinforcing fibers and a thermoplastic resin, wherein the reinforcing fibers include short fibers and include reinforcing fibers arranged in a wavy arrangement in the thickness direction.

Figure 1:
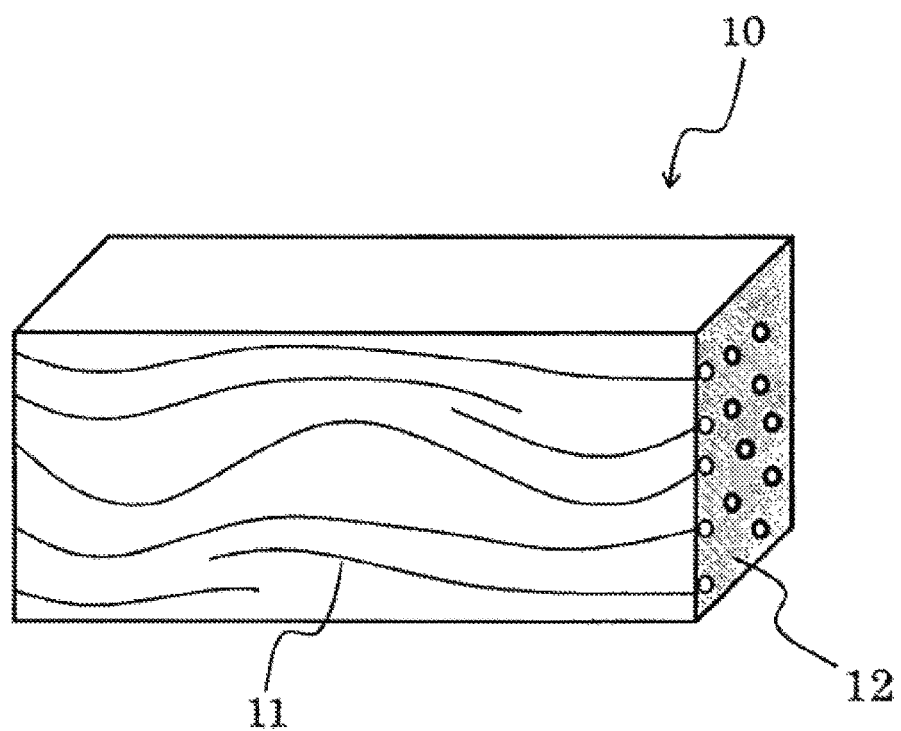
FIG. 1 is a diagrammatic view which shows one embodiment of the fiber-reinforced plastic shaped product of the invention.

The fiber-reinforced plastic shaped product of the invention, which has such configuration, is explained below by reference to the drawings. FIG. 1 is a diagrammatic view which shows one embodiment of the fiber-reinforced plastic shaped product of the invention. As shown in FIG. 1, this fiber-reinforced plastic shaped product 10 of the invention is constituted by a fiber-reinforced resin material including reinforcing fibers 11 and a thermoplastic resin 12 and is characterized in that the reinforcing fibers 11 include short fibers and include reinforcing fibers 11 arranged in a wavy arrangement in the thickness direction.

In FIG. 1, the reinforcing fibers 11 have been drawn linearly for convenience of illustration. However, this drawing is only for illustration, and the reinforcing fibers in the invention include at least short fibers and may be a combination of short fibers with long fibers or continuous fibers according to need, irrespective of the illustration shown in FIG. 1. This applies in the drawings other than FIG. 1 in the present specification.

In the fiber-reinforced plastic shaped product of the invention, due to the inclusion of the reinforcing fibers arranged in a wavy arrangement in the thickness direction, at least some of the reinforcing fibers can be caused to present in such a state that the major-axis directions thereof are inclined toward the thickness direction. Consequently, the thickness-direction mechanical strength can be improved. Moreover, since the reinforcing fibers are not broken into shorter fibers in the wavy arrangement, a considerable decrease in in-plane-direction mechanical strength as in the needle punching method can be inhibited.

The fiber-reinforced plastic shaped product of the invention can be produced, for example, by subjecting a preform such as a prepreg to compression molding so that at least some of the reinforcing fibers are arranged in a wavy arrangement in the thickness direction. According to such a production process, there is no large limitation on the thickness of the preform and it is possible to use a thinner thickness preform for obtaining a thinner thickness shaped product. In addition, since it is possible to inhibit the thickness-direction expansion due to the so-called spring back, the production process is free from the trouble that the reinforcing fibers become bulky to reduce the formability. Because of these, when producing the fiber-reinforced plastic shaped product of the invention, it is easy to apply simpler mold structures. Furthermore, it is easy to dispose a mechanism for causing reinforcing fibers arranged in a wavy arrangement in the thickness direction to be present in a given position, making it easy to obtain a fiber-reinforced plastic shaped product in which the thickness-direction mechanical strength has been locally improved.

In addition, since the fiber-reinforced plastic shaped product of the invention includes short fibers as at least some of the reinforcing fibers, there is an advantage in that even in cases when arrangement of the reinforcing fibers in a wavy arrangement has resulted in the formation of gaps, reinforcing fibers can be caused to be present in the gaps. Consequently, regions where no reinforcing fibers are present can be inhibited from being formed in the fiber-reinforced plastic shaped product.

As apparent from the above explanation, the fiber-reinforced plastic shaped product of the invention produces an effect wherein the shaped product has excellent thickness-direction mechanical strength while retaining intact in-plane-direction mechanical strength.

As stated above, the fiber-reinforced plastic shaped product of the invention is constituted by a fiber-reinforced resin material including reinforcing fibers and a thermoplastic resin, and is characterized in that the reinforcing fibers include short fibers and include reinforcing fibers which have been arranged in a wavy arrangement in the thickness direction. Since the fiber-reinforced plastic shaped product of the invention is characterized by including the reinforced fibers arranged in a wavy arrangement in a thickness direction, the wavy arrangement in the thickness direction is explained first below, followed by the fiber-reinforced resin material to be used in the invention.

1 Wavy Arrangement in Thickness Direction

Figure 5:
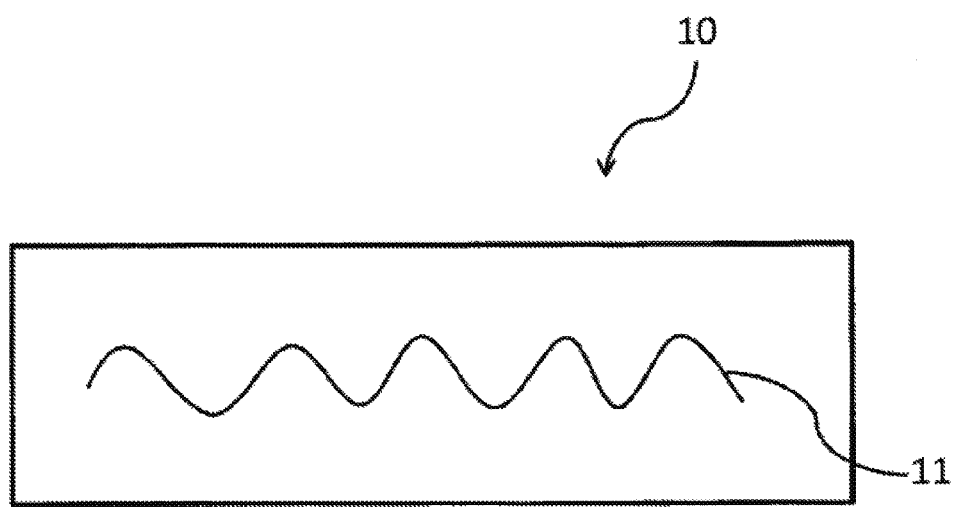
FIG. 5 is a diagrammatic view which shows a further embodiment of the fiber-reinforced plastic shaped product of the invention.
Figure 6:
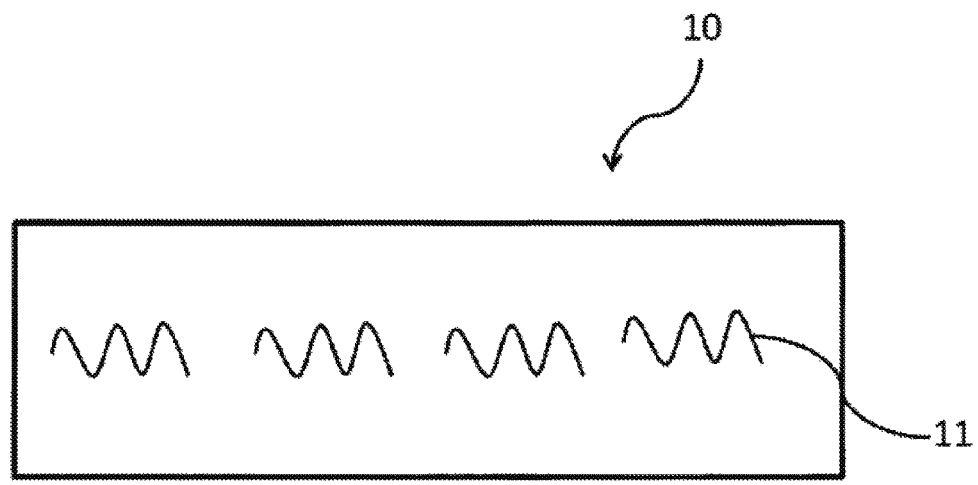
FIG. 6 is a diagrammatic view which shows a further embodiment of the fiber-reinforced plastic shaped product of the invention.
Figure 7:
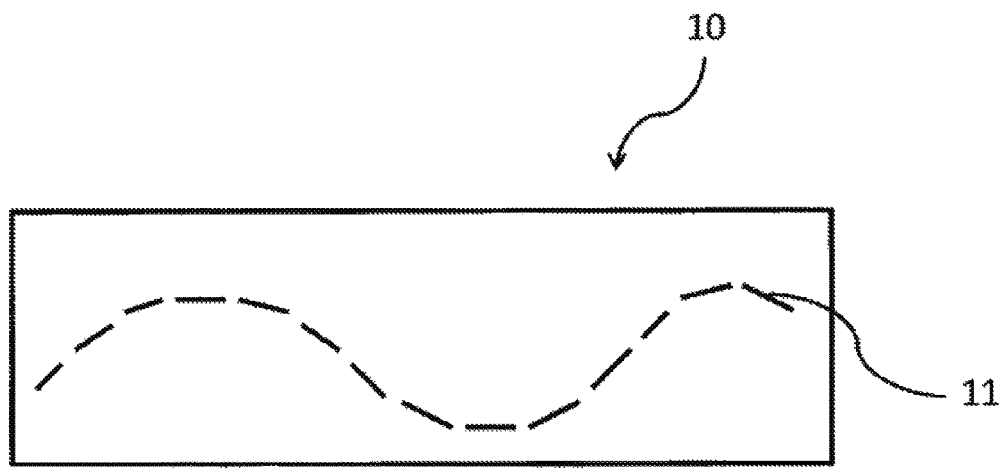
FIG. 7 is a diagrammatic view which shows a further embodiment of the fiber-reinforced plastic shaped product of the invention.

As stated above, the fiber-reinforced plastic shaped product of the invention is characterized by containing reinforcing fibers arranged in a wavy arrangement in the thickness direction. The expression "arranged in a wavy arrangement in the thickness direction" used for reinforcing fibers in the invention means that either reinforcing fibers themselves or a reinforcing-fiber layer in which reinforcing fibers are present in the state of having been aligned in an in-plane direction is bent or curved in the thickness direction. Examples of the case where reinforcing fibers are bent or curved in the thickness direction include not only the case where reinforcing fibers are bent or curved in the thickness direction (for example, the cases shown by the diagrammatic view of FIG. 5 and the diagrammatic view of FIG. 6) but also the case where although reinforcing fibers themselves are not bent or curved, the line in any cross-section which connects the major-axis directions of adjoining fibers is bent or curved (for example, the case shown by the diagrammatic view of FIG. 7). The reinforcing fibers arranged in a wavy arrangement in the thickness direction may be short fibers or may be continuous fibers or long fibers. In the following explanations, the wavy arrangement in the thickness direction is often referred to simply as "wavy arrangement".

The amplitude of the wavy arrangement (the thickness of a region where reinforcing fibers arranged in a wavy arrangement in the thickness direction are present) is not particularly limited so long as the thickness-direction strength of the fiber-reinforced plastic shaped product of the invention can be regulated to a desired level. In the invention, the amplitude of the wavy arrangement may be even or uneven. However, in the case where reinforcing fibers arranged in a wavy arrangement are contained in a position where the thickness of the fiber-reinforced plastic shaped product of the invention changes, it is preferable that the amplitude should change in accordance with the changes in thickness.

In the invention, a configuration wherein at least some of the reinforcing fibers contained in the fiber-reinforced plastic shaped product have been arranged in the wavy arrangement suffices. Consequently, in the invention, all the reinforcing fibers contained in the fiber-reinforced plastic shaped product may have been arranged in a wavy arrangement or only some of the reinforcing fibers may have been arranged in a wavy arrangement. Preferred of these in the invention is the configuration wherein only some of the reinforcing fibers have been arranged in a wavy arrangement. The reason for this is as follows. The fiber-reinforced plastic shaped product of the invention can be produced by forming a prepreg. However, in cases when all the reinforcing fibers are arranged in a wavy arrangement, momentary pressurization unevenness due to, for example, reinforcing-fiber unevenness in the material is prone to occur and this may result in a tendency that the wavy arrangement is disordered. Although it is necessary, for eliminating such trouble, that a mold equipped with a special mechanism should be used in the forming step, there is a possibility in this case that the production efficiency might decrease considerably. In contrast, in cases when some of the reinforcing fibers only have been arranged in a wavy arrangement, such a problem is less apt to arise and a simpler mechanism or a simpler mold structure can be employed in the forming step. As a result, it becomes possible to obtain, at a lower cost, a fiber-reinforced plastic shaped product having excellent thickness-direction mechanical strength.

In the invention, the embodiment in which only some of the reinforcing fibers have been arranged in the wavy arrangement is not particularly limited and can be suitably determined in accordance with applications of the fiber-reinforced plastic shaped product of the invention, the production process therefor, or the like. Consequently, the embodiment may be, for example, one (first embodiment) in which reinforcing fibers have been arranged in the wavy arrangement only in some of the thickness-direction regions of the shaped product, one (second embodiment) in which reinforcing fibers have been arranged in the wavy arrangement only in some of the in-plane-direction regions of the shaped product, and one (third embodiment) which is a combination of the first embodiment and the second embodiment.

Figure 2A:
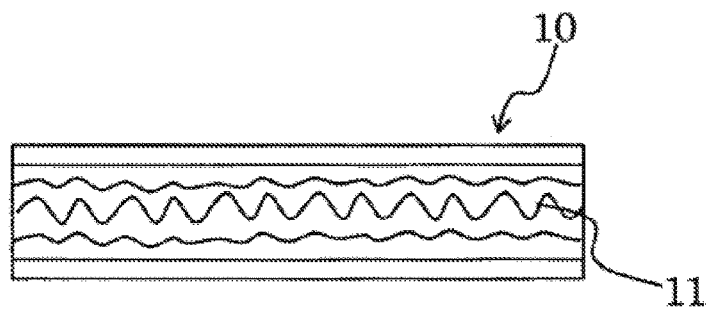
FIGS. 2A to 2C are diagrammatic views which show other embodiments of the fiber-reinforced plastic shaped product of the invention.
Figure 2B:
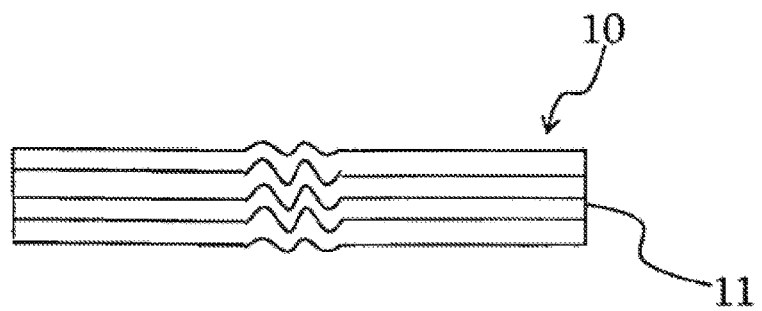
Figure 2C:
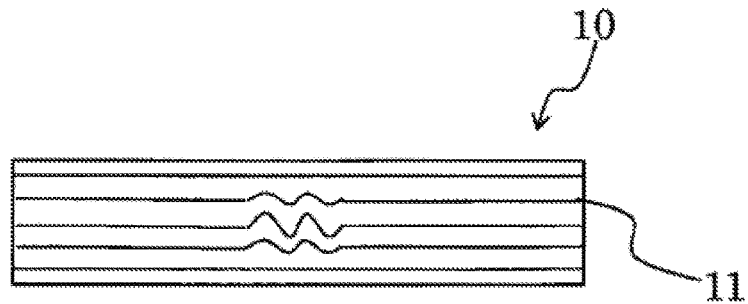

These embodiments are explained below with reference to drawings. FIGS. 2A to 2C are diagrammatic views which show embodiments of the embodiment of the fiber-reinforced plastic shaped product of the invention in which only some of the reinforcing fibers have been arranged in a wavy arrangement. As shown in FIGS. 2A to 2C, the embodiment of the fiber-reinforced plastic shaped product 10 of the invention in which only some of the reinforcing fibers 11 have been arranged in a wavy arrangement may be one (first embodiment) in which reinforcing fibers 11 have been arranged in the wavy arrangement only in some of the thickness-direction regions (FIG. 2A), one (second embodiment) in which reinforcing fibers have been arranged in the wavy arrangement only in some of the in-plane-direction regions (FIG. 2B), and one which is a combination of the first embodiment and the second embodiment (FIG. 2C).

In the invention, any of the first to the third embodiments can be advantageously used. The first embodiment has an advantage in that since both reinforcing fibers arranged in a wavy arrangement and reinforcing fibers aligned in an in-plane direction are present, the in-plane-direction strength can be inhibited from decreasing while improving the thickness-direction mechanical strength. In the second embodiment, it is possible to improve the thickness-direction mechanical strength only in the portion where wavily arranged reinforcing fibers are present and to maintain the in-plane-direction mechanical strength as such in the portion where there are no reinforcing fibers arranged in a wavy arrangement in the thickness direction. Consequently, this embodiment has an advantage in that the thickness-direction mechanical strength can be improved locally in in-plane directions. Furthermore, the third embodiment has an advantage in that the in-plane-direction strength of the portion where wavily arranged reinforcing fibers are present can be inhibited from decreasing.

In the case of the embodiment in which the reinforcing fibers have been arranged in the wavy arrangement only in some of the thickness-direction regions, the proportion, along the thickness direction, of the region where reinforcing fibers arranged in the wavy arrangement are present can be suitably determined in accordance with applications of the fiber-reinforced plastic shaped product of the invention and with the production process therefor, and is not particularly limited. In particular, in the present invention, the proportion, along the thickness direction, of the region where reinforcing fibers arranged in the wavy arrangement are present is preferably in the range of 5% to 95% of the thickness of the fiber-reinforced plastic shaped product, more preferably in the range of 50% to 90% thereof, even more preferably in the range of 70% to 80% thereof. This is because in cases when the proportion thereof is within that range, the thickness-direction mechanical strength can be improved while further inhibiting the in-plane-direction mechanical strength from decreasing.

Figure 3:
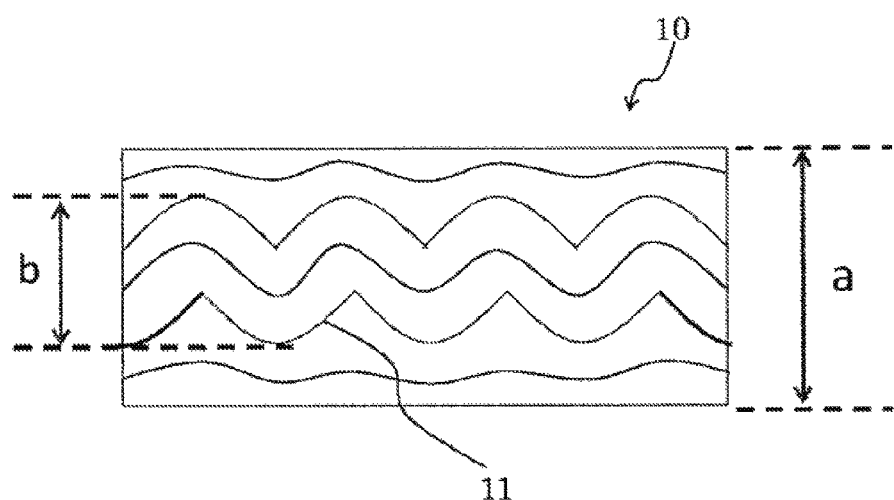
FIG. 3 is a schematic view which illustrates how to determine the proportion, along the thickness direction, of reinforcing fibers arranged in the wavy arrangement in a fiber-reinforced plastic shaped product of the invention.

Here, a method for determining the proportion, along the thickness direction, of the region where reinforcing fibers arranged in a wavy arrangement are present is explained with reference to a drawing. FIG. 3 is a view for explaining how to determine the proportion. As shown in FIG. 3, that proportion can be determined by calculating the proportion of the thickness (b) of the region where reinforcing fibers arranged in a wavy arrangement in the thickness direction are present to the thickness (a) of the fiber-reinforced plastic shaped product 10 (the proportion being b/a×100). The thickness (b) of the region where reinforcing fibers arranged in a wavy arrangement in the thickness direction is the thickness-direction distance between the highest point and lowest point of the region. In the case where there are a plurality of regions where reinforcing fibers arranged in a wavy arrangement in the thickness direction are present, the sum of the thicknesses of all these regions is taken as the value of b.

In the case of the embodiment in which the reinforcing fibers have been arranged in the wavy arrangement only in some of the thickness-direction regions, the thickness-direction position where the wavily arranged reinforcing fibers are present is not particularly limited. It is, however, preferable that the wavily arranged reinforcing fibers should be present only in one or more inner layers. This is because in cases when reinforcing fibers arranged in the wavy arrangement are present only in one or more inner layers, it is easy to make the fiber-reinforced plastic shaped product have a cross-section which is close to a symmetrical structure and, hence, the shaped product can be rendered less apt to suffer deformations such as warpage. The state wherein reinforcing fibers arranged in the wavy arrangement are present "only in one or more inner layers" means that the reinforcing fibers present in each surface layer of the fiber-reinforced plastic shaped product of the invention have not been arranged in a wavy arrangement and at least some of the reinforcing fibers present in regions other than the surface layers have been arranged in a wavy arrangement.

The orientation angle of the reinforcing fibers in the wavy arrangement is not particularly limited so long as the thickness-direction strength of the fiber-reinforced plastic shaped product of the invention can be regulated to a desired level. The closer the orientation angle to 90°, the higher the thickness-direction strength of the region where the wavily arranged reinforcing fibers are present. Conversely, the closer the orientation angle to 0°, the lower the thickness-direction strength of that portion. In the invention, the orientation angle is preferably in the range of 10° to 90°, more preferably in the range of 60° to 90°, even more preferably in the range of 85° to 90°. This is because in cases when the orientation angle is within that range, the thickness-direction mechanical strength can be improved while further inhibiting the in-plane-direction mechanical strength from decreasing.

In the case where the fiber-reinforced plastic shaped product of the invention contains a plurality of reinforcing fibers which differ in the orientation angle, then the orientation angle is an average value of these.

The term "orientation angle" means the largest of the angles formed by the in-plane direction of the fiber-reinforced plastic shaped product of the invention and the wavily arranged reinforcing fibers.

Figure 4:
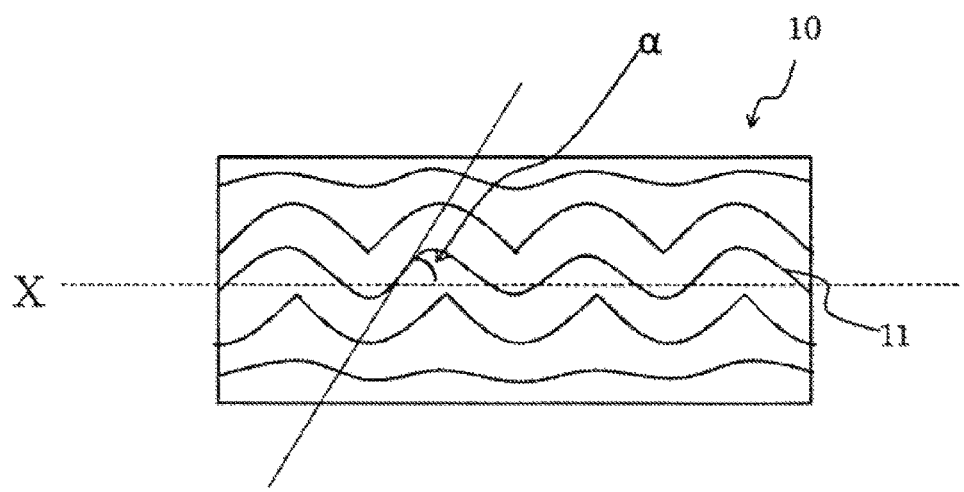
FIG. 4 is a schematic view which illustrates the orientation angle of reinforcing fibers contained in a fiber-reinforced plastic shaped product of the invention.

The orientation angle is explained with reference to a drawing. FIG. 4 is a view for explaining the orientation angle. As shown in FIG. 4, the expression "orientation angle of reinforcing fibers 11 arranged in a wavy arrangement" means the largest angle α among the angles formed by the in-plane direction X of the fiber-reinforced plastic shaped product 10 and the reinforcing fibers 11 arranged in a wavy arrangement.

In the invention, the embodiment in which the reinforcing fibers have been arranged in the wavy arrangement is some of the thickness-direction regions may be one in which reinforcing fibers arranged in the wavy arrangement are scatteringly present in the thickness direction or may be one in which reinforcing fibers arranged in the wavy arrangement are present in one or more layers in the thickness direction. Of these, the presence thereof in one or more layers is preferred in the invention. This is because in cases when reinforcing fibers arranged in the wavy arrangement are present in one or more layers in the thickness direction, the thermoplastic resin is apt to be more effectively reinforced by the reinforcing fibers and the thermoplastic resin thus reinforced renders the reinforcing fibers less apt to suffer fiber buckling, resulting in a further improvement in the major-axis-direction strength of the reinforcing fibers.

In the case where reinforcing fibers arranged in the wavy arrangement are present in one or more layers in the thickness direction, there may be only one layer of wavily arranged reinforcing fibers in the thickness direction or there may be two or more such layers in the thickness direction. In the case where there are two or more such layers, these layers may be equal or different in the phase of the wavy arrangement.

In the case where the reinforcing fibers have been arranged in the wavy arrangement in some of the thickness-direction regions, the arrangement of the reinforcing fibers which have not been arranged in a wavy arrangement is not particularly limited. Consequently, the oriented or aligned state of the reinforcing fibers which have not been arranged in a wavy arrangement may be the state in which the reinforcing fibers have been aligned unidirectionally or may be the state in which the reinforcing fibers have been randomly oriented. Furthermore, the arrangement may be random orientation which is intermediate between the uniaxial alignment and the two-dimensional random orientation (the disordered orientation being an arrangement in which the major-axis directions of the reinforcing fibers neither have been completely aligned unidirectionally nor are completely random). In accordance with the fiber length of the reinforcing fibers, the reinforcing fibers may have been aligned so that the major-axis directions of the reinforcing fibers make an angle with an in-plane direction of the fiber-reinforced plastic shaped product, or may have been oriented so as to be intertwined with one another like cotton. Furthermore, the reinforcing fibers may have been aligned or oriented as in a bidirectional or multi-axial woven fabric, such as plain weave fabric or twill weave fabric, or in nonwoven fabric, mat, knit, braid, or paper obtained from reinforcing fibers by a wet lay method. Preferred of these in the invention is a configuration wherein the reinforcing fibers which have not been wavily arranged have been randomly oriented two-dimensionally so that the major-axis directions of the reinforcing fibers have been randomly oriented in the in-plane directions, from the standpoint of improving both thickness-direction mechanical strength and in-plane-direction mechanical strength.

2 Fiber-Reinforced Resin Material

Next, the fiber-reinforced resin material to be used in the invention is explained. The fiber-reinforced resin material to be used in the invention includes reinforcing fibers and a thermoplastic resin.

(1) Reinforcing Fibers (Kinds of the Reinforcing Fibers)

The kind of reinforcing fibers to be used in the invention can be suitably selected in accordance with the kind of the thermoplastic resin which will be described later and with the degree of the strength to be imparted to the fiber-reinforced plastic shaped product of the invention, and is not particularly limited. Consequently, either inorganic fibers or organic fibers are suitable for use as the reinforcing fibers to be used in the invention.

Examples of the inorganic fibers include carbon fibers, active-carbon fibers, graphite fibers, glass fibers, tungsten carbide fibers, silicon carbide fibers, ceramic fibers, alumina fibers, mineral fibers such as natural fibers and basalt, boron fibers, boron nitride fibers, boron carbide fibers, and metal fibers. Examples of the metal fibers include aluminum fibers, copper fibers, brass fibers, stainless-steel fibers, and steel fibers. Examples of the glass fibers include fibers made of glass-E, glass-C, glass-S, glass-D, and glass-T, quartz glass fibers, and borosilicate glass fibers. Examples of the organic fibers include fibers made of organic materials such as polybenzazole, aramids, PBO (poly-p-phenylenebenzoxazole), poly(phenylene sulfide), polyesters, acrylics, polyamides, polyolefins, poly(vinyl alcohol), and polyarylates.

In the invention, two or more kinds of reinforcing fibers may be used in combination. In the case, multiple kinds of inorganic fibers may be used in combination, or multiple kinds of organic fibers may be used in combination, or inorganic fibers and organic fibers may be used in combination. Examples of the embodiment in which multiple kinds of inorganic fibers are used in combination include a embodiment in which carbon fibers and metal fibers are used in combination and a embodiment in which carbon fibers and glass fibers are used in combination. Meanwhile, examples of the embodiment in which multiple kinds of organic fibers are used in combination include a embodiment in which aramid fibers and fibers made of another organic material are used in combination. Furthermore, examples of the embodiment in which inorganic fibers and organic fibers are used in combination include a embodiment in which carbon fibers and aramid fibers are used in combination.

It is preferable that the reinforcing fibers to be used in the invention should be at least one kind of fibers selected from the group consisting of carbon fibers, glass fibers, metal fibers, ceramic fibers, polybenzazole fibers, and aramid fibers. Of these, carbon fibers are preferred. This is because use of carbon fibers makes it possible to ensure high strength and rigidity while attaining lightweight properties, and because there is hence an advantage in that when the fiber-reinforced plastic shaped product of the invention is applied to motor vehicles, the fuel efficiency and driving performance can be improved.

Generally known as the carbon fibers are polyacrylonitrile (PAN)-based carbon fibers, carbon fibers based on petroleum or coal pitch, rayon-based carbon fibers, cellulose-based carbon fibers, lignin-based carbon fibers, phenol-based carbon fibers, vapor phase epitaxy carbon fibers, and the like. Any of these kinds of carbon fibers can be advantageously used in the invention.

The reinforcing fibers to be used in the invention may be ones which have a sizing agent adherent to the surface thereof. In the case of using reinforcing fibers having a sizing agent adherent to the surface thereof, the kind of the sizing agent can be suitably selected in accordance with the kinds of the reinforcing fibers and of the thermoplastic resin and is not particularly limited.

(Fiber Length of the Reinforcing Fibers)

The reinforcing fibers to be used in the invention include short fibers. The average fiber length of the short fibers to be used in the invention can be suitably selected in accordance with the kind of the reinforcing fibers, kind of the thermoplastic resin, or the like so that desired strength can be imparted to the fiber-reinforced plastic shaped product of the invention, and is not particularly limited. In particular, in the invention, the average fiber length of the short fibers is preferably in the range of 1 mm to 100 mm, more preferably in the range of 5 mm to 75 mm, especially preferably in the range of 10 mm to 50 mm. This is because in cases when the average fiber length of the short fibers is within such range, the reinforcing fibers can be more easily arranged in a wavy arrangement.

The reinforcing fibers to be used in the invention may be any reinforcing fibers which at least include short fibers. Consequently, short fibers only may be used as the reinforcing fibers, or short fibers and long fibers may be used in combination. The term "long fibers" means fibers having a larger average fiber length than the short fibers. Such long fibers may be either discontinuous fibers or continuous fibers, so long as the average fiber length thereof is larger than that of the short fibers.

In the case where short fibers only are used as the reinforcing fibers, two or more kinds of short fibers which differ in fiber length from each other may be used in combination. In other words, the reinforcing fibers to be used in the invention may be ones which give a fiber length distribution having a single peak, or may be ones which give a fiber length distribution having a plurality of peaks. In the case of reinforcing fibers having a plurality of peaks, it is preferable that the value of at least one of the peaks should be within the preferred range of the average fiber length shown above. The average fiber length (La) of reinforcing fibers can be determined, for example, by randomly extracting 100 reinforcing fibers from the fiber-reinforced resin material, measuring the fiber length (Li) of each of the 100 reinforcing fibers with a caliper or the like to the order of mm, and calculating the average length on the basis of the following expression. The extraction of reinforcing fibers from the fiber-reinforced resin material can be conducted, for example, after the fiber-reinforced resin material is subjected to a heat treatment of about 500° C.×1 hr to remove the resin within the oven.

$$La = \Sigma Li/100$$

The method for determining average fiber length described above is a method for determining number-average fiber length. Meanwhile, the weight-average fiber length of the short fibers in the invention is preferably in the range of 1 mm to 100 mm, more preferably in the range of 5 mm to 75 mm, especially preferably in the range of 10 mm to 50 mm. When the fiber length of each carbon fiber is expressed by Li and the number of carbon fibers examined is expressed by j, then the weight-average fiber length (Lw) is determined using the following expression.

$$Lw = (\Sigma Li^2)/(\Sigma Li)$$

Incidentally, in the case where the reinforcing fibers have a constant fiber length as in the case of reinforcing fibers cut with the rotary cutter which will be described later, the number-average fiber length and the weight-average fiber length have the same value.

(Fiber Diameter of the Reinforcing Fibers)

The fiber diameter of the reinforcing fibers to be used in the invention may be suitably determined in accordance with the kind of the reinforcing fibers, and is not particularly limited. For example, in the case of using carbon fibers as the reinforcing fibers, the average fiber diameter thereof is usually preferably in the range of 3 µm to 50 µm, more preferably in the range of 4 µm to 12 µm, even more preferably in the range of 5 µm to 5 µm.

Meanwhile, in the case of using glass fibers as the reinforcing fibers, the average fiber diameter thereof is usually preferably in the range of 3 µm to 30 µm. The term "average fiber diameter" herein means the diameter of the single reinforcing fibers. Consequently, in the case of reinforcing fibers which are in the form of fiber bundles, that term means not the diameter of the fiber bundles but the diameter of the reinforcing fibers (single fibers) constituting the fiber bundles. The average fiber diameter of reinforcing fibers can be determined, for example, by the method described in JIS R-7607:2000.

(State of the Reinforcing Fibers)

Regardless of the kind thereof, the reinforcing fibers to be used in the invention may be composed of independent single fibers or may be in the form of fiber bundles each made up of a plurality of single fibers. The reinforcing fibers to be used in the invention may be ones composed of independent single fibers alone or ones composed of fiber bundles alone, or may be ones including these two kinds of reinforcing fibers intermingled with each other. In the case of using reinforcing fibers in the form of fiber bundles, the fiber bundles may be even or different in the number of single fibers constituting the bundle. In the case where the reinforcing fibers to be used in the invention are in the form of fiber bundles, the number of the single fibers constituting each fiber bundle is not particularly limited. However, the number thereof is usually in the range of 1,000 to 100,000.

In general, carbon fibers are available in the form of fiber bundles each made up of several thousands to tens of thousands of filaments gathered together. In cases when carbon fibers are used as the reinforcing fibers and the carbon fibers in the form of such fiber bundles are used as such, then the portions where entangled fiber bundles are present may have a locally increased thickness, making it difficult to obtain a thin fiber-reinforced resin material. Consequently, in the case of using carbon fibers as the reinforcing fibers, it is preferable that the fiber bundles should be widened or opened before use.

In the case of opening the carbon fiber bundles before use, the degree of opening of the opened carbon fiber bundles is not particularly limited. It is, however, preferred to control the degree of opening of the fiber bundles so that the carbon fibers to be used include both carbon fiber bundles each made up of carbon fibers not less than a specific number and carbon fibers (single fibers) or carbon fiber bundles each made up of a smaller number of carbon fibers. In this case, it is specifically preferable that the carbon fibers to be used should be composed of: carbon fiber bundles (A) each made up of carbon fibers, the number of which is not less than the critical number of single fibers defined by the following expression (1); and carbon fibers which have undergone opening, i.e., carbon fibers in the form of independent single fibers or fiber bundles each made up of carbon fibers, the number of which is less than the critical number of single fibers.

$$\text{Critical number of single fibers} = 600/D \tag{1}$$

(D is the average fiber diameter (µm) of the carbon single fiber.)

In the invention, the proportion of the carbon fiber bundles (A) to all the carbon fibers in the fiber-reinforced resin material is preferably higher than 0 vol % but less than 99 vol %, more preferably 20 vol % or higher but less than 99 vol %, even more preferably 30 vol % or higher but less than 95 vol %, most preferably 50 vol % or higher but less than 90 vol %. This is because by causing carbon fiber bundles each made up of carbon fibers not less than the specific number to coexist with other fibers, which are carbon fibers or carbon fiber bundles that have undergone opening, in a specific proportion as shown above, the amount of the carbon fibers present, i.e., the volume content of fibers (Vf), in the fiber-reinforced resin material can be increased.

The degree of opening of the carbon fibers can be regulated to a value within a desired range by regulating the fiber bundle opening conditions. For example, in the case of opening fiber bundles by blowing air against the fiber bundles, the degree of opening can be regulated by controlling, for example, the pressure of the air which is being blown against the fiber bundles. In this case, heightening the air pressure tends to result in a higher degree of opening (result in fiber bundles each made up of a smaller number of single fibers), and lowering the air pressure tends to result in a lower degree of opening (result in fiber bundles each made up of a larger number of single fibers).

In the case of using carbon fibers as the reinforcing fibers in the invention, the average number of fibers (N) of the carbon fiber bundles (A) is not particularly limited and can be suitably determined so long as the objects of the invention are not defeated thereby.

In the case of carbon fibers, the N is usually in the range of 1<N<12,000. It is, however, preferable that the N should satisfy the following expression (2).

$$0.6 \times 10^4/D^2 < N < 6 \times 10^5 < D^2 \tag{2}$$

(D is the average fiber diameter (µm) of the carbon single fiber.)

(2) Thermoplastic Resin

The thermoplastic resin to be used in the invention can be suitably selected in accordance with applications of the fiber-reinforced plastic shaped product of the invention and with the production process therefor, and is not particularly limited. The thermoplastic resin to be used in the invention usually is one having a softening point in the range of 180-350° C., but usable thermoplastic resins are not limited thereto.

Examples of the thermoplastic resin to be used in the invention include polyolefin resins, polystyrene resins, thermoplastic polyamide resins, polyester resins, polyacetal resins (polyoxymethylene resins), polycarbonate resins, (meth)acrylic resins, polyarylate resins, poly(phenylene ether) resins, polyimide resins, polyethernitrile resins, phenoxy resins, poly(phenylene sulfide) resins, polysulfone resins, polyketone resins, polyetherketone resins, thermoplastic urethane resins, fluororesins, and thermoplastic polybenzoimidazole resins.

Examples of the polyolefin resins include polyethylene resins, polypropylene resins, polybutadiene resins, polymethylpentene resins, vinyl chloride resins, vinylidene chloride resins, vinyl acetate resins, and poly(vinyl alcohol) resins. Examples of the polystyrene resins include polystyrene resins, acrylonitrile-styrene resins (AS resins), and acrylonitrile/butadiene/styrene resins (ABS resins). Examples of the polyamide resins include polyamide-6 resins (nylon-6), polyamide-11 resins (nylon-11), polyamide-12 resins (nylon-12), polyamide-46 resins (nylon-46), polyamide-66 resins (nylon-66), and polyamide-610 resins (nylon-610). Examples of the polyester resins include poly(ethylene terephthalate) resins, poly(ethylene naphthalate) resins, poly(butylene terephthalate) resins, poly(trimethylene terephthalate) resins, and liquid-crystal polyesters. Examples of the (meth)acrylic resins include poly(methyl methacrylate). Examples of the poly(phenylene ether) resins include modified poly(phenylene ether)s. Examples of the polyimide resins include thermoplastic polyimides, poly(amide-imide) resins, and polyetherimide resins. Examples of the polysulfone resins include modified polysulfone resins and poly(ether sulfone) resins. Examples of the polyetherketone resins include polyetherketone resins, polyetheretherketone resins, and polyetherketoneketone resins. Examples of the fluororesins include polytetrafluoroethylene.

One thermoplastic resin may be used as the only thermoplastic resin in the invention, or two or more thermoplastic resins may be used in the invention. Examples of the embodiment in which two or more thermoplastic resins are used in combination in the invention include a embodiment in which thermoplastic resins differing in softening point or melting point are used in combination and a embodiment in which thermoplastic resins differing in average molecular weight are used in combination. However, the combined use of thermoplastic resins is not limited to these examples.

(3) Fiber-Reinforced Resin Material

The amount of the thermoplastic resin to be present in the fiber-reinforced resin material to be used in the invention can be suitably determined in accordance with the kind of the thermoplastic resin, kind of the reinforcing fibers, or the like, and is not particularly limited. Usually, however, the amount thereof is in the range of 3 to 1,000 parts by mass per 100 parts by mass of the reinforcing fibers.

The volume content of the reinforcing fibers (Vf) in the fiber-reinforced resin material is not particularly limited so long as the fiber-reinforced plastic shaped product can be made to have a strength on a desired level, and can be suitably determined in accordance with the kind of the reinforcing fibers, average fiber length of the reinforcing fibers, etc. In particular, in the invention, a lower limit of the volume content of the reinforcing fibers (Vf) is preferably 10% or higher, more preferably 20% or higher, even more preferably 30% or higher. Meanwhile, an upper limit of the volume content of the reinforcing fibers is preferably 70% or less, more preferably 60% or less, even more preferably 50% or less.

Although the fiber-reinforced resin material to be used in the invention at least includes reinforcing fibers and a thermoplastic resin as described above, this resin material may contain various additives according to need so long as the inclusion thereof does not defeat the objects of the invention. The various additives to be used in the invention are not particularly limited so long as the additives can impart the desired functions, properties, etc. to the fiber-reinforced resin material in accordance with applications of the fiber-reinforced plastic shaped product of the invention, etc. Examples of such various additives include melt viscosity lowering agents, antistatic agents, pigments, softeners, plasticizers, surfactants, electroconductive particles, fillers, carbon blacks, coupling agents, blowing agents, lubricants, corrosion inhibitors, nucleators, crystallization accelerators, release agents, stabilizers, ultraviolet absorbers, colorants, coloring inhibitors, antioxidants, flame retardants, flame retardant aids, dripping inhibitors, lubricants, fluorescent brighteners, phosphorescent pigments, fluorescent dyes, flow improvers, inorganic and organic antibacterial agents, insecticides, photocatalyst-based antifouling agents, infrared absorbers, and photochromic agents.

Short fibers having a small fiber length may be contained as one of the various additives in the fiber-reinforced resin material to be used in the invention. The short fibers to be used here can be the same as the reinforcing fibers described above, except that the short fibers to be used here have a smaller average fiber length (weight-average fiber length or number-average fiber length) than the reinforcing fibers described above. Examples of the short fibers, which have a smaller fiber length than the reinforcing fibers described above, include ones having an average fiber length (weight-average fiber length or number-average fiber length) of 1 mm or less.

The areal weight of the reinforcing fibers in the fiber-reinforced resin material is not particularly limited, and is usually in the range of 25 $g/m^2$ to 10,000 $g/m^2$.

3 Fiber-Reinforced Plastic Shaped Product

The fiber-reinforced plastic shaped product of the invention may be one constituted by a single layer, or may be one having a multilayer structure configured of a plurality of superposed layers. The embodiment in which the fiber-reinforced plastic shaped product of the invention has a multilayer structure may be a embodiment in which a plurality of layers having the same composition have been superposed, or may be a embodiment in which a plurality of layers differing in composition have been superposed.

The thickness of the fiber-reinforced plastic shaped product of the invention is not particularly limited. However, the thickness thereof is usually preferably in the range of 0.01 mm to 100 mm, preferably in the range of 0.01 mm to 10 mm, more preferably in the range of 0.1 mm to 5 mm. In the case where the fiber-reinforced plastic shaped product of the invention has the multilayer structure, that term "thickness" does not mean the thickness of each layer but means the thickness of the fiber-reinforced plastic shaped product, which is the sum of the thicknesses of the individual layers.

4 Process for Producing the Fiber-Reinforced Plastic Shaped Product

The fiber-reinforced plastic shaped product of the invention can be produced, for example, though (1) a step in which reinforcing fibers are cut, (2) a step in which the cut reinforcing fibers are opened, (3) a step in which the opened reinforcing fibers are mixed with a fibrous or particulate thermoplastic resin and the mixture is then heated and compressed to obtain a prepreg, and (4) a step in which the prepreg is formed. For the steps (1) to (3) above, the methods described, for example, in International Publication WO 2012/105080 can be used.

Methods for disposing at least some of the reinforcing fibers in a wavy arrangement are not particularly limited, and the wavy arrangement can be attained by controlling the properties of the fiber-reinforced plastic, forming conditions therefor, mold structure, or the like. For example, the reinforcing fibers can be arranged in a wavy arrangement by conducting the compression molding of the step (4) using a specific mold. Specifically, by using a mold for compression molding to which a structure or mechanism for disposing reinforcing fibers in a wavy arrangement has been imparted, the reinforcing fibers can be easily arranged in a wavy arrangement. Examples of the structure or mechanism of the mold include: a mechanism which shapes the prepreg in the position where the reinforcing fibers are to be arranged in a wavy arrangement; and a method in which the mold is made to have recessed portions only in the position where the reinforcing fibers are to be arranged in a wavy arrangement, and the reinforcing fibers are arranged in a wavy arrangement in the position where the recessed portions have been arranged. In the case of the latter method, the recessed portions of the mold may be arranged in either the upper mold half or the lower mold half. It is, however, preferred to dispose the recessed portions in the upper mold half, from the standpoint that a more stationary wavy arrangement can be obtained.

Examples of the properties of the fiber-reinforced plastic include flowability. In general, the higher the flowability, the more the reinforcing fibers are easily arranged in a wavy arrangement. However, since there are often cases where fiber-reinforced plastics having high flowability have poor mechanical strength, designs suitable for purposes are required. Examples of the forming conditions for the fiber-reinforced plastic include forming temperature, pressurization rate, and charge ratio. In general, higher forming temperatures, higher pressurization rates, and higher charge ratios facilitate the disposition of the reinforcing fibers in a wavy arrangement. However, too high forming temperatures result in the possibility of impairing the mechanical properties of the fiber-reinforced plastic shaped product, and expensive equipment is necessary for heightening the pressurization rate. Furthermore, the charge ratio must be determined while taking account of the shape of the shaped product, or the like. It is therefore necessary to select forming conditions in accordance with purposes.

The present invention should not be construed as being limited to the embodiments shown above. The embodiments are mere examples, and any modification thereof which has substantially the same configuration as the technical idea described in the claims of the present invention and which produces similar effects is included in the technical range of the present invention.

EXAMPLES

Examples are shown below, but the invention should not be construed as being limited to the following Examples.

The values in the Examples and Comparative Examples were determined in accordance with the following methods.
(1) The average fiber length of carbon fibers was determined by heating the fiber-reinforced plastic shaped product at 500° C. to remove the resin, randomly extracting 300 fibers from the residual carbon fiber structure, measuring the fiber length of each of the fibers with a caliper down to the order of mm, and averaging the measured values. The average thickness and weight-average fiber width of carbon fiber bundles were determined by randomly extracting 300 fiber bundles from the carbon fiber structure and measuring the thickness and width with a caliper down to the order of mm, and weight thereof.
(2) The fiber bundles of each prepreg were analyzed in accordance with the method described in Internal Publication WO 2012/105080.

Production Example 1

As carbon fibers, use was made of carbon fibers "Tenax" (registered trademark) STS40-24KS (average fiber diameter, 7 μm), manufactured by Toho Tenax Co., Ltd, which had been cut to an average fiber length of 20 mm. As a matrix resin was used nylon-6 resin A1030, manufactured by Unichika, Ltd. In accordance with the method described in International Publication WO 2012/105080, the carbon fibers and the matrix resin were used to produce a mat which had a carbon-fiber areal weight of 1,800 g/m² and a nylon-6-resin areal weight of 1,500 g/m² and in which the carbon fibers had been randomly oriented two-dimensionally. Specifically, as a separating device for the carbon fibers, use was made of a slitter obtained by producing disk-shaped blades using a superhard alloy and disposing the blades at intervals of 0.5 mm. As a cutting device, use was made of a rotary cutter including spiral knifes arranged in the surface thereof and obtained using a superhard alloy. The blade pitch in this device was regulated to 20 mm so that the carbon fibers were cut into a fiber length of 20 mm.

The strands which had passed through the cutter were introduced into a flexible transporting pipeline arranged directly under the rotary cutter and were then introduced into an opening device. Used as the opening device was a double-pipe device produced by welding nipples made of SUS304 and differing in diameter. Small holes were formed in the wall of the inner pipe of the double-pipe device, and compressed air was supplied using a compressor to the space between the inner pipe and the outer pipe. As a result, the air ejected through the small holes had a wind velocity of 100 m/sec. A tapered pipe in which the diameter gradually increased downward was welded to the lower part of the double-pipe device.

The matrix resin was fed through the sidewall of the tapered pipe. An air-permeable support (hereinafter referred to as a fixing net) traveling in a certain direction was arranged under the outlet of the tapered pipe, and suction was performed from under the fixing net with a blower. While reciprocating the flexible transporting pipeline and the tapered pipe in the width direction, a mixture of the cut carbon fibers and the nylon resin was deposited in a strip form on the fixing net. The feed rates of the carbon fibers and nylon-6 resin were set at 500 g/min and 530 g/min, respectively, to operate the apparatus, thereby obtaining on the fixing net a random mat constituted by a mixture of the carbon fibers and the nylon-6 resin. Using a mold having recessed portions in the upper part thereof, this mat was heated for 5 minutes at 2.0 MPa by means of a press heated at 260° C. to obtain a prepreg (I) having a thickness of 2.3 mm.

With respect to the prepreg (I) obtained, the carbon fibers contained therein were analyzed. As a result, it was found that the critical number of single fibers, which is defined by expression (1), was 86, the average number of single fibers (N) in carbon fiber bundles (A) each configured of not less than the critical number of single fibers was 420, and the proportion of the carbon fiber bundles (A) each configured of not less than the critical number of single fibers was 85 vol % based on all the carbon fibers. The volume content of the carbon fibers was 43% (the content of carbon fibers on a mass basis was 54%). The carbon fiber bundles had an average thickness of 30 μm and a weight-average fiber width of 0.5 mm.

Production Example 2

A prepreg (II) was produced in the same manner as in Production Example 1, except that the carbon fiber feed rate and the nylon-6 resin feed rate were regulated to 340 g/min and 530 g/min, respectively, and that the carbon-fiber areal weight and the nylon-6-resin areal weight were regulated to 1,200 g/m² and 1,500 g/m², respectively.

With respect to the prepreg (II) obtained, the carbon fibers contained therein were analyzed. As a result, it was found that the critical number of single fibers, which is defined by expression (1), was 86, the average number of single fibers (N) in carbon fiber bundles (A) each configured of not less than the critical number of single fibers was 420, and the proportion of the carbon fiber bundles (A) each configured of not less than the critical number of single fibers was 85 vol % based on all the carbon fibers. The volume content of the carbon fibers was 31% (the content of carbon fibers on a mass basis was 42%). The carbon fiber bundles had an average thickness of 30 μm and a weight-average fiber width of 0.5 mm.

Production Example 3

A prepreg (III) was produced in the same manner as in Production Example 1, except that the reinforcing-fiber feed rate and the matrix resin feed rate were regulated to 170 g/min and 530 g/min, respectively, and that the reinforcing-fiber areal weight and the nylon-6-resin areal weight were regulated to 600 g/m$^2$ and 1,500 g/m$^2$, respectively.

With respect to the prepreg (III) obtained, the carbon fibers contained therein were analyzed. As a result, it was found that the critical number of single fibers, which is defined by expression (1), was 86, the average number of single fibers (N) in carbon fiber bundles (A) each configured of not less than the critical number of single fibers was 420, and the proportion of the carbon fiber bundles (A) each configured of not less than the critical number of single fibers was 85 vol % based on all the carbon fibers. The volume content of the carbon fibers was 25% (the content of carbon fibers on a mass basis was 31%). The carbon fiber bundles had an average thickness of 30 μm and a weight-average fiber width of 0.5 mm.

[Evaluation of Energy Absorbing Power]

The fiber-reinforced plastic shaped products obtained in the Examples and Comparative Examples were each subjected to a punching test in which a weight was caused to fall freely under the following conditions. The energy absorbing power thereof was thus evaluated.

The test conditions are as follows.

Specimen shape; fiber-reinforced plastic shaped product of 60 mm (width)×60 mm (length)

Testing machine: IMATEC IM10

Shape of the weight (indenter): r=5 mm

Weight of the weight: 9.3 kg

Example 1

The prepreg (I) was cut into a size of 380 mm×380 mm, and the cut sheets were dried in a 120° C. hot-air drying oven for 4 hours and then heated to 300° C. with an infrared heater. A mold having an area of 400 mm×400 mm and including an upper mold half having recessed portions over an area of 80 mm×370 mm was used. This mold was set at 140° C., and two of the heated sheets of the prepreg (I) were stacked, introduced into the mold, and pressed for 1 minute at a pressing pressure of 20 MPa, thereby producing a fiber-reinforced plastic shaped product 1. In the fiber-reinforced plastic shaped product 1 obtained, reinforcing fibers which had been arranged in a wavy arrangement in the thickness direction were included in the portion corresponding to the recessed portions of the mold. The thickness of the shaped product 1 was 4.5 mm, and the region where the reinforcing fibers arranged in a wavy arrangement in the thickness direction were present had a thickness of 3.5 mm. The proportion of the region where the reinforcing fibers arranged in a wavy arrangement in the thickness direction were present was 78% of the thickness of the fiber-reinforced plastic shaped product. The orientation angle of the reinforcing fibers arranged in a wavy arrangement was 85°. This fiber-reinforced plastic shaped product 1 was subjected to the measurement of energy absorbing power. The results obtained are as shown in Table 1.

Example 2

A fiber-reinforced plastic shaped product 2 was obtained by stacking and forming three sheets of the prepreg (I) in a manner similar to that used in Example 1. This fiber-reinforced plastic shaped product 2 had a thickness of 5.7 mm, and the region where reinforcing fibers arranged in a wavy arrangement were present had a thickness of 4.2 mm. The orientation angle of the reinforcing fibers arranged in a wavy arrangement was 75°. The proportion of the region where the reinforcing fibers arranged in a wavy arrangement in the thickness direction were present was 74% of the thickness of the fiber-reinforced plastic shaped product. This fiber-reinforced plastic shaped product 2 was subjected to the measurement of energy absorbing power. The results obtained are as shown in the table.

Comparative Example 1

A fiber-reinforced plastic shaped product 3 having a thickness of 4.5 mm was obtained by superposing a forming plate of 75 mm×360 mm so as to fill the recessed portions of the upper mold half and to avoid formation of a wavy shape, in a manner similar to that used in Example 1. The fiber-reinforced plastic shaped product 3 included no reinforcing fibers arranged in a wavy arrangement. This fiber-reinforced plastic shaped product 3 was subjected to the measurement of energy absorbing power. As a result, the value was lower by about 30% than that of Example 1, as shown in Table 1.

Comparative Example 2

A fiber-reinforced plastic shaped product 4 having a thickness of 5.7 mm and including no wavy shape was obtained in a manner similar to that used in Comparative Example 1. The fiber-reinforced plastic shaped product 4 included no reinforcing fibers arranged in a wavy arrangement. This fiber-reinforced plastic shaped product 4 was subjected to the measurement of energy absorbing power. As a result, the value was lower by about 25% than that of Example 2, as shown in Table 1.

Example 3

A fiber-reinforced plastic shaped product 5 which had a thickness of 4.5 mm and in which the region where reinforcing fibers arranged in a wavy arrangement were present had a thickness of 2.4 mm and the orientation angle of the reinforcing fibers arranged in a wavy arrangement was 55° was obtained by changing the prepreg (I) heating temperature used in Example 1 to 240° C. The proportion of the region where the reinforcing fibers arranged in a wavy arrangement in a thickness direction were present was 53% of the thickness of the fiber-reinforced plastic shaped product. This fiber-reinforced plastic shaped product 5 was subjected to the measurement of energy absorbing power. The results obtained are as shown in the table, and the value was higher by about 25% than that of Comparative Example 1, which had the same thickness.

Example 4

A fiber-reinforced plastic shaped product 6 was obtained by stacking and forming three sheets of the prepreg (I) in a manner similar to that used in Example 3. This fiber-reinforced plastic shaped product 6 had a thickness of 5.7 mm, and the region where reinforcing fibers arranged in a wavy arrangement were present had a thickness of 2.7 mm. The orientation angle of the reinforcing fibers arranged in a wavy arrangement was 45°. The proportion of the region where the reinforcing fibers arranged in a wavy arrangement in the thickness direction were present was 47% of the thickness of the fiber-reinforced plastic shaped product. This fiber-reinforced plastic shaped product 6 was subjected to the measurement of energy absorbing power. The results obtained are as shown in the table, and the value was higher by about 6% than that of Comparative Example 2, which had the same thickness.

Example 5

A fiber-reinforced plastic shaped product 7 which had a thickness of 4.5 mm and in which the region where reinforcing fibers arranged in a wavy arrangement were present had a thickness of 1.8 mm and the orientation angle of the reinforcing fibers arranged in a wavy arrangement was 40° was obtained by changing the mold temperature used in Example 3 to 100° C. The proportion of the region where the reinforcing fibers arranged in a wavy arrangement in a thickness direction were present was 40% of the thickness of the fiber-reinforced plastic shaped product. This fiber-reinforced plastic shaped product 7 was subjected to the measurement of energy absorbing power. The results obtained are as shown in the table, and the value was higher by about 10% than that of Comparative Example 1, which had the same thickness.

Example 6

A fiber-reinforced plastic shaped product 8 was obtained by forming the prepreg (I) without stacking, in a manner similar to that used in Example 5. This fiber-reinforced plastic shaped product 8 had a thickness of 3.2 mm, and the region where reinforcing fibers arranged in a wavy arrangement were present had a thickness of 0.6 mm. The orientation angle of the reinforcing fibers arranged in a wavy arrangement was 25°. The proportion of the region where the reinforcing fibers arranged in a wavy arrangement in the thickness direction were present was 19% of the thickness of the fiber-reinforced plastic shaped product. This fiber-reinforced plastic shaped product 8 was subjected to the measurement of energy absorbing power. The results obtained are as shown in the table.

Comparative Example 3

A fiber-reinforced plastic shaped product 9 having a thickness of 3.2 mm and including no wavy shape was obtained in a manner similar to that used in Comparative Example 1. The fiber-reinforced plastic shaped product 9 included no reinforcing fibers arranged in a wavy arrangement. This fiber-reinforced plastic shaped product 9 was subjected to the measurement of energy absorbing power. As a result, the value was lower by about 10% than that of Example 6, as shown in Table 1.

Example 7

A fiber-reinforced plastic shaped product 10 which had a thickness of 4.5 mm and in which the region where reinforcing fibers arranged in a wavy arrangement were present had a thickness of 3.9 mm and the orientation angle of the reinforcing fibers arranged in a wavy arrangement was 85° was obtained by changing the mold temperature used in Example 1 to 150° C. The proportion of the region where the reinforcing fibers arranged in a wavy arrangement in a thickness direction were present was 87% of the thickness of the fiber-reinforced plastic shaped product. This fiber-reinforced plastic shaped product 10 was subjected to the measurement of energy absorbing power. The results obtained are as shown in the table, and the value was higher by about 35% than that of Comparative Example 1, which had the same thickness.

Example 8

A fiber-reinforced plastic shaped product 11 was obtained by stacking and forming three sheets of the prepreg (I) in a manner similar to that used in Example 7. This fiber-reinforced plastic shaped product 11 had a thickness of 5.7 mm, and the region where reinforcing fibers arranged in a wavy arrangement were present had a thickness of 5.2 mm. The orientation angle of the reinforcing fibers arranged in a wavy arrangement was 70°. The proportion of the region where the reinforcing fibers arranged in a wavy arrangement in the thickness direction were present was 91% of the thickness of the fiber-reinforced plastic shaped product. This fiber-reinforced plastic shaped product 11 was subjected to the measurement of energy absorbing power. The results obtained are as shown in the table, and the value was higher by about 20% than that of Comparative Example 2, which had the same thickness.

Example 9

A fiber-reinforced plastic shaped product 12 was obtained by forming the prepreg (I) without stacking, in a manner similar to that used in Example 7. This fiber-reinforced plastic shaped product 12 had a thickness of 3.2 mm, and the region where reinforcing fibers arranged in a wavy arrangement were present had a thickness of 2.4 mm. The orientation angle of the reinforcing fibers arranged in a wavy arrangement was 85°. The proportion of the region where the reinforcing fibers arranged in a wavy arrangement in the thickness direction were present was 75% of the thickness of the fiber-reinforced plastic shaped product. This fiber-reinforced plastic shaped product 12 was subjected to the measurement of energy absorbing power. The results obtained are as shown in the table, and the value was higher by about 40% than that of Comparative Example 3, which had the same thickness.

TABLE 1

|  | Thickness of shaped product | Wavy arrangement Included or not included | Thickness | Proportion | Fiber angle | Energy absorbing power |
|---|---|---|---|---|---|---|
| Example 1 | 4.5 mm | included | 3.5 mm | 78% | 85° | 58 J |
| Example 2 | 5.7 mm | included | 4.2 mm | 74% | 75° | 85 J |
| Example 3 | 4.5 mm | included | 2.4 mm | 53% | 55° | 51 J |
| Example 4 | 5.7 mm | included | 2.7 mm | 47% | 45° | 69 J |
| Example 5 | 4.5 mm | included | 1.8 mm | 40% | 40° | 45 J |
| Example 6 | 3.2 mm | included | 0.6 mm | 19% | 25° | 25 J |
| Example 7 | 4.5 mm | included | 3.9 mm | 87% | 85° | 55 J |
| Example 8 | 5.7 mm | included | 5.2 mm | 91% | 70° | 77 J |
| Example 9 | 3.2 mm | included | 2.4 mm | 75% | 85° | 32 J |
| Comparative | 4.5 mm | not | — | — | — | 41 J |

TABLE 1-continued

| | Thickness of shaped product | Wavy arrangement | | | | Energy absorbing power |
|---|---|---|---|---|---|---|
| | | Included or not included | Thickness | Proportion | Fiber angle | |
| Example 1 | | included | | | | |
| Comparative Example 2 | 5.7 mm | not included | — | — | — | 65 J |
| Comparative Example 3 | 3.2 mm | not included | — | — | — | 23 J |

INDUSTRIAL APPLICABILITY

The fiber-reinforced plastic shaped product of the invention is capable of improving the thickness-direction mechanical strength without impairing the in-plane-direction mechanical strength and reducing the product thickness of the shaped product without impairing the formability. The shaped product of the invention can hence be utilized, for example, as components for vehicles, such as structural members for motor vehicles.

While the invention has been described in detail and with reference to specific embodiments thereof, it will be apparent to one skilled in the art that various changes and modifications can be made therein without departing from the spirit and scope thereof.

This application is based on a Japanese patent application filed on Mar. 20, 2014 (Application No. 2014-058165), the contents thereof being incorporated herein by reference.

DESCRIPTION OF THE REFERENCE NUMERALS AND SIGNS

10 Fiber-reinforced plastic shaped product
11 Reinforcing fibers
12 Thermoplastic resin
X In-plane direction of fiber-reinforced plastic shaped product
α Orientation angle of reinforcing fibers

The invention claimed is:

1. A fiber-reinforced plastic shaped product comprising a fiber-reinforced resin material containing reinforcing fibers and a thermoplastic resin,
wherein the reinforcing fibers include short fibers and an average fiber length of the short fibers is in a range of 1 mm to 50 mm,
some but not all of the reinforcing fibers being the short fibers are arranged in a wavy arrangement in a thickness direction,
wherein the reinforcing fibers being the short fibers and arranged in the wavy arrangement in the thickness direction are presented in a layered form,
wherein the proportion, in the thickness direction, of regions where the reinforcing fibers arranged in the wavy arrangement in the thickness direction are present is in a range of 50% to 90% of the thickness of the fiber-reinforced plastic shaped product, and
the reinforcing fibers arranged in the wavy arrangement in the thickness direction have an orientation angle in a range of 60° to 90°.

2. The fiber-reinforced plastic shaped product according to claim 1,
wherein only in a region in the thickness direction, the reinforcing fibers are arranged in the wavy arrangement in the thickness direction.

3. The fiber-reinforced plastic shaped product according to claim 1,
wherein the reinforcing fibers arranged in the wavy arrangement in the thickness direction are present only in an inner layer.

4. The fiber-reinforced plastic shaped product according to claim 1,
wherein the reinforcing fibers arranged in the wavy arrangement in the thickness direction have an orientation angle in a range of 10° to 90°.

5. The fiber-reinforced plastic shaped product according to claim 1,
wherein the reinforcing fibers are in a form of fiber bundles and have an average fiber length in a range of 1 mm to 50 mm.

6. The fiber-reinforced plastic shaped product according to claim 1,
wherein the reinforcing fibers arranged in the wavy arrangement are present only in one or more inner layers.

7. The fiber-reinforced plastic shaped product according to claim 1, including the reinforcing fibers being the short fibers arranged in a wavy arrangement in a thickness direction produced by a compression molding of a prepreg including the reinforcing fibers and the thermoplastic resin with a mold having recessed portions.

* * * * *